No. 616,573. Patented Dec. 27, 1898.
A. C. HERTZ.
CULINARY VESSEL.
(Application filed Sept. 29, 1898.)

(No Model.)

WITNESSES
H. H. Lamb
J. W. Range

INVENTOR
Alfred C. Hertz
By his Atty
Geo. D. Phillips

UNITED STATES PATENT OFFICE.

ALFRED C. HERTZ, OF BRIDGEPORT, CONNECTICUT.

CULINARY VESSEL.

SPECIFICATION forming part of Letters Patent No. 616,573, dated December 27, 1898.

Application filed September 29, 1898. Serial No. 692,205. (No model.)

*To all whom it may concern:*

Be it known that I, ALFRED C. HERTZ, a citizen of the United States, and a resident of Bridgeport, in the county of Fairfield and State of Connecticut, have invented certain new and useful Improvements in Culinary Vessels, of which the following is a specification.

My invention relates to an improvement in cooking vessels, and has for its object to provide an adjustable rim adapted to embrace a perforated cooker and rest on the edge of a pot, so that the cooker may be used in connection with pots of any depth, which improvement will be more fully set forth in the following specification.

To enable others to understand my invention, reference is had to the accompanying drawings, in which—

Figure 1:
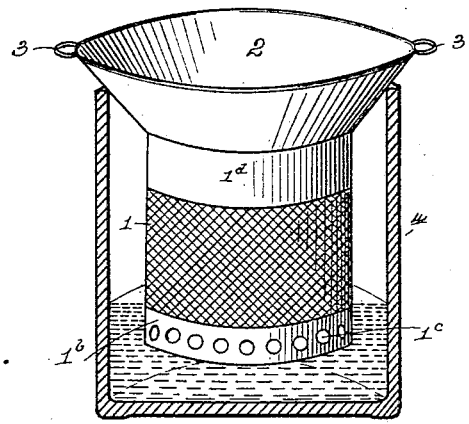
Figure 5:
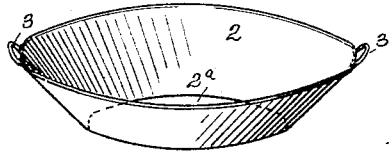
Figure 2:
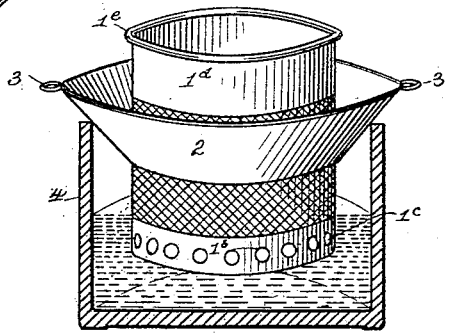
Figure 4:
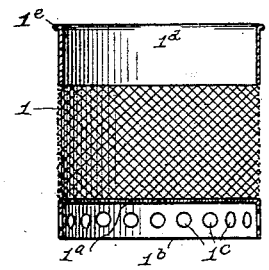
Figure 3:
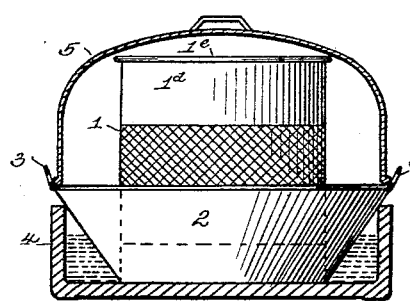

Figure 1 represents a view of my improved cooking apparatus suspended by its adjustable rim in a deep pot, which pot is represented in section. Fig. 2 is a view showing the adjustable rim resting on a shallower pot or vessel than that shown at Fig. 1. Fig. 3 is a view showing the lowest position—viz., with the adjustable rim resting on the bottom of a pot or other outer vessel, which vessel is represented in section. Fig. 4 is a detail vertical sectional view of the perforated cooker. Fig. 5 is a detail perspective view of the adjustable rim.

Its construction and operation are as follows:

1 is the perforated cooker, having (see Fig. 4) the perforated bottom $1^a$ placed at the bottom of that portion of the cooker having the finer perforations. Below this bottom $1^a$ is the skirt $1^b$, having the larger perforations $1^c$. On the upper end is the band $1^d$, and $1^e$ is a bead around the upper edge.

2 is the adjustable rim, (see also Fig. 5,) having the vertical sides and the central hole $2^a$, adapted to be adjustably mounted on the cylindrical cooker 1.

3 are handles whereby the whole apparatus is lifted from the pot 4 or other like vessel in which the cooker is adapted to be placed.

5, Fig. 3, is a cover adapted to rest on the rim 2 and inclose the same and the interior cooker 1.

The advantage of my peculiar construction is that the apparatus is adapted for use in connection with an outer vessel or pot of any depth. In using it in a vessel deeper than the peforated cooker 1, as shown at Fig. 1, the rim 2 will rest on the upper edge of the pot 4, while the cooker 1 will be suspended by its upper beading $1^e$. In using the device in a a shallower vessel or pot, as shown at Fig. 2, the rim 2 will simply occupy a lower place on the cooker 1, but still rest on the upper edge of the pot, as before. In Fig. 3 a very shallow vessel is used, so that both the bottom of the rim 2 and the skirt of the cooker will rest on the bottom of the pot, while the top of the rim will rest on the pot; but in this case the perforated bottom $1^a$, Fig. 4, being always above the bottom of the pot 4 and maintained thereby the skirt $1^b$ the contents of the cooker cannot burn, while the perforations $1^c$ in said skirt will allow of a free circulation of steam and water to the interior of the cooker.

The lid 5 is made deep enough to inclose the cooker, no matter what its position may be with respect to the outer pot or vessel, in which it is suspended or placed.

The advantage of my device over others of its class lies in the fact that it needs no special outer pot, but can be used in connection with any pot, basin, or other vessel that the culinary department of any ordinary household is equipped with, whether such vessel is deep or shallow.

The cooker is removed from the pot by means of the handles 3, which lift the rim and its lid also, thus leaving the contents of the outer vessel or pot, if soup is being made, free from the coarser particles contained in the cooker, while the articles in the cooker are free from the liquid in the pot.

Having thus described my invention, what I claim as new, and desire to secure by Letters Patent, is—

The herein-described improvement in culinary vessels of the character described, consisting of a perforated cooker having an open mouth and a perforated bottom, a skirt projecting below such perforated bottom and having perforated sides so that when said cooker is resting against the bottom of a pot the perforated bottom of said cooker will be protected by said skirt, combined with a rim adjustably mounted on said cooker and adapted to rest on the outer edge of a pot, and a lid adapted to inclose both said cooker and rim, means on said cooker to be engaged by said rim whereby the said cooker is lifted, substantially as shown and for the purpose set forth.

Signed at Bridgeport, in the county of Fairfield and State of Connecticut, this 28th day of September, A. D. 1898.

ALFRED C. HERTZ.

Witnesses:
DAVID M. LACKIE,
J. W. RANGE.